United States Patent
Kamal et al.

(10) Patent No.: US 9,198,255 B2
(45) Date of Patent: Nov. 24, 2015

(54) VOLTAGE TO CURRENT ARCHITECTURE TO IMPROVE PWM PERFORMANCE OF OUTPUT DRIVERS

(71) Applicant: NXP B.V., Eindhoven (NL)

(72) Inventors: Abu Kamal, Santa Clara, CA (US); James Caravella, Chandler, AZ (US)

(73) Assignee: NXP B.V., Eindhoven (NL)

( * ) Notice: Subject to any disclaimer, the term of this patent is extended or adjusted under 35 U.S.C. 154(b) by 297 days.

(21) Appl. No.: 13/827,578

(22) Filed: Mar. 14, 2013

(65) Prior Publication Data

US 2014/0265887 A1    Sep. 18, 2014

(51) Int. Cl.
*H05B 37/00* (2006.01)
*H05B 33/08* (2006.01)

(52) U.S. Cl.
CPC ........ *H05B 33/0887* (2013.01); *H05B 33/0818* (2013.01); *H05B 33/0884* (2013.01); *Y02B 20/347* (2013.01)

(58) Field of Classification Search
CPC ............................... H05B 37/02; H05B 3/049
USPC .................. 315/186, 193, 194, 291, 294, 297
See application file for complete search history.

(56) References Cited

U.S. PATENT DOCUMENTS 7,508,636 B2    3/2009    Sellier et al.
8,247,992 B2 *  8/2012    Liu et al. ........................ 315/291
8,405,320 B2 *  3/2013    Huang et al. ................... 315/291
2011/0234110 A1    9/2011    Liu et al.
2012/0212866 A1    8/2012    Ko et al.

FOREIGN PATENT DOCUMENTS

| | | |
|---|---|---|
| CN | 1617281 A | 5/2005 |
| CN | 201910659 U | 7/2011 |
| CN | 102647176 A | 8/2012 |
| JP | 2008-4706 A | 1/2008 |

OTHER PUBLICATIONS

Extended European Search Report for European Patent Appln. No. 14158106.6 (Jun. 26, 2014).
NXP Product Data Sheet, PCA9952; PCA9955 "16-channel Fm+ I2C-bus 57 mA constant current LED driver" Rev. 5—Oct. 1, 2012.
Sansen, Willy. "Analog Design Essentials." The International Series in Engineering and Computer Science (2006). Book (Table of Content Only).

* cited by examiner

*Primary Examiner* — Hai L Nguyen (57) ABSTRACT

Various aspects of the present disclosure include a controlled current path having a load that draws current from the controlled current path. In response to a modulating voltage signal, current is controlled through the load which causes a transistor circuit, including a transistor, to switch between two current modes. Switching will subject the transistor to voltage stresses due to current in the controlled current path spiking towards a breakdown threshold of the transistor. In response to a first aspect of the modulating voltage signal and in one of the current modes, the current in the controlled current path is directed through the first current branch. In response to a second aspect of the modulating voltage signal and in the other current mode, the current in the controlled current path is diverted from the first current branch to a second current branch.

16 Claims, 6 Drawing Sheets

VOLTAGE TO CURRENT ARCHITECTURE TO IMPROVE PWM PERFORMANCE OF OUTPUT DRIVERS

Voltage to current (V2I) converters are useful as output drivers in controlling current through a load, such as a string of light emitting diodes (LEDs). More specifically, a current mode controller (with a low-side control) can be provided to control the current through LEDs through a connection to the drain of an NMOS transistor. This type of configuration is used because, for multiple LEDs, an NMOS transistor such as an extended drain NMOS (EDNMOS), can withstand high voltages.

An example configuration of a V2I converter utilizes a reference voltage applied to a non-inverting node of a feedback amplifier. This amplifier, having a high open loop gain, ensures that a source voltage is equal to the reference voltage. An NMOS transistor (N-type MOSFET), connected to the output of the amplifier, acts as a source follower. The negative feedback, from the source side of the NMOS transistor to the inverting side of the amplifier, keeps the source from fluctuating, and allows for a high output impedance of the V2I converter. An output current of such a V2I converter sets due to the reference voltage and a variable source resistor (connected between the source of the NMOS transistor and ground). The source resistance is trimmed, using a resistor-based digital to analog converter (R-DAC), to control the output current equal or corresponding to a ratio of the source voltage and the source resistance, or a ratio of the reference voltage and the source resistance.

A relatively-high voltage supply is needed in a V2I configuration to control current through a load (such as a light emitting diode (LED) string) to accommodate forward voltages of the load and to drain voltage needed to keep the NMOS transistor in saturation. A ratio of the current reference voltage and the source resistance, for a given value of either, can be controlled using a modulating voltage signal, such as pulse width modulation (PWM) to switch the output current on and off. This can be accomplished by opening the feedback loop of the V2I converter, and grounding the gate of the NMOS transistor simultaneously. A maximum current for the V2I converter is set by the current control signal (CC) as available from the DAC. The controlled current varies the source resistance to generate different output current. In instances where the load is an LED string and for each value of CC, the output current is programmed using PWM pulse to vary the average current to achieve dimming and blinking of the LEDs. Dimming and blinking are PWM frequency dependent, with higher frequency resulting in dimming and lower in blinking.

Another example configuration of a V2I converter utilizes a PWM control architecture to switch on an off a load (e.g., an LED string). In this configuration, a reference voltage is applied to a non-inverting node of a feedback amplifier, with an NMOS transistor, connected to the output of the amplifier, acting as a source follower. The connection between the output of the amplifier and the NMOS transistor includes two connections, having switches controlled by the PWM, to ground. The source of the NMOS transistor is connected to the inverting node of the amplifier, creating negative feedback, and to ground through a resistor having a digital to analog converter (R-DAC). These connections include switches controlled by PWM and CC. The drain of the NMOS transistor is connected to the load. Additionally, the negative feedback loop created can also be fed to ground due to a switch being present in a path between the inverting side of the transistor and ground. In order to bias the load, a supply voltage is provided thereto. In this configuration, the transistor can become stressed due to the supply voltage. For instance, if the junction breakdown of the transistor is lower than the maximum supply voltage used for the load, then the transistor can be over stressed and breakdown.

Various example embodiments are directed to voltage to current converter control circuits and their implementation.

For instance, various aspects of the present disclosure are directed toward methods and apparatus that include a controlled current path having a load (e.g., LED string) that draws current from the controlled current path. Current through the load is controlled, using a control circuit and in response to first and second aspects of a modulating voltage signal, by causing a transistor circuit to switch between a current-conducting mode and a current-blocking mode. The transistor circuit includes a transistor, and utilizes a first current branch and a second current branch in switching between the two modes. In the current-conducting mode, the control current is drawn through the first current branch. In the current-blocking mode, the controlled current through the first branch is blocked. In switching the transistor between the current-conducting mode and the current-blocking mode, junctions of the transistor are subjected to voltage stresses due to current in the controlled current path spiking towards a breakdown threshold of the transistor.

Additionally, in response to the first aspect of the modulating voltage signal (in the current-conducting mode), the methods and apparatus of the present disclosure utilize the transistor circuit to direct current in the controlled circuit path through the first current branch. Further, in response to the second aspect of the modulating voltage signal (in the current-blocking mode), the methods and apparatus of the present disclosure divert the current in the controlled current path from the first current branch to the second current branch sufficiently fast to suppress current spikes in the controlled current path and the junctions from reaching the breakdown threshold of the transistor and thereby avoiding junction breakdown.

Aspects of the present disclosure are also directed towards methods and apparatus that include a controlled current path having an LED string that draws current from the controlled current path and turns on and off in response thereto. Current through the LED string is controlled in response to first and second aspects of a pulse-width modulation signal by causing a transistor circuit (including a transistor) to switch between two modes. The first mode is a current-conducting mode in which the controlled current is drawn through a first current branch. The second mode is a current-blocking mode in which the controlled current through the first current branch is blocked. Junctions of the transistor, switching between the current-conducting mode and the current-blocking mode, are subjected to voltage stresses due to current in the controlled current path spiking, causing the LED string to malfunction, towards a breakdown threshold of the transistor. In response to the first aspect of the pulse-width modulation signal and in the current-conducting mode, the transistor circuit directs current in the controlled current path through the first current branch. In response to the second aspect of the pulse-width modulation signal and in the current-blocking mode, the current in the controlled current path is diverted from the first current branch to a second current branch sufficiently fast to suppress current spikes in the controlled current path and the junctions from reaching the breakdown threshold of the transistor and thereby avoiding junction breakdown.

Additionally, in certain embodiments, the second current path is used to provide a light bias in the current-conducting mode and is activated to provide a greater bias in the current-blocking mode, thereby permitting for immediate affect when switching between the current-conducting mode and the current-blocking mode.

The above discussion/summary is not intended to describe each embodiment or every implementation of the present disclosure. The figures and detailed description that follow also exemplify various embodiments.

Various example embodiments may be more completely understood in consideration of the following detailed description in connection with the accompanying drawings, in which.

While the disclosure is amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims. In addition, the term "example" as used throughout this application is only by way of illustration, and not limitation.

Aspects of the present disclosure are believed to be applicable to a variety of different types of devices, systems and arrangements directed toward control of current through a load in a controlled current path based on a modulating voltage signal. Controlling the current of a load such as a light emitting diode (LED) string is useful in avoiding spiked currents provided to the LED chain during switching of the LED on and off. The spiked current affects the load by unneeded dimming and flickering of the LEDs. While the present disclosure is not necessarily so limited, various aspects of the disclosure may be appreciated through a discussion of examples using this context.

Various example embodiments are directed to methods and apparatus that include a controlled current path including a load (e.g., LED string) that draws current from the controlled current path. In response to first and second aspects of a modulating voltage signal, a control circuit is provided to control current through the load in the controlled current path by causing a transistor circuit (which includes a transistor) to switch between a current-conducting mode and a current-blocking mode by utilizing a first current branch and a second current branch. In the current-conducting mode, the control current is drawn through the first current branch. In the current-blocking mode, the controlled current through the first branch is blocked. Additionally, switching the transistor between the current-conducting mode and the current-blocking mode subjects junctions of the transistor to voltage stresses due to current in the controlled current path spiking towards a breakdown threshold of the transistor.

In response to the first aspect of the modulating voltage signal (in the current-conducting mode), the methods and apparatus of the present disclosure utilize the transistor circuit to direct current in the controlled circuit path through the first current branch. Additionally, in response to the second aspect of the modulating voltage signal (in the current-blocking mode), the methods and apparatus of the present disclosure divert the current in the controlled current path from the first current branch to the second current branch sufficiently fast to suppress current spikes in the controlled current path and the junctions from reaching the breakdown threshold of the transistor and thereby avoiding junction breakdown.

Various aspects of the present disclosure are also directed toward methods and apparatus including a controlled current path having an LED string. The LED string draws current from the controlled current path and turns on and off in response to the current. Current through the LED string is controlled in response to first and second aspects of a pulse-width modulation signal, by causing a transistor circuit, including a transistor, to switch between a current-conducting mode and a current-blocking mode. The current-conducting mode draws the controlled current through the first branch, and the current-blocking mode blocks the controlled current in the first branch. Additionally, switching the transistor between the current-conducting mode and the current-blocking mode subjects junctions of the transistor to voltage stresses due to current in the controlled current path spiking, which causes the LED string to malfunction (e.g., flicker, dim), towards a breakdown threshold of the transistor. In response to the first aspect of the pulse-width modulation signal and in the current-conducting mode, the transistor circuit directs current in the controlled current path through the first current branch. Further, in response to the second aspect of the pulse-width modulation signal and in the current-blocking mode, the current in the controlled current path is diverted from the first current branch to a second current branch sufficiently fast to suppress current spikes in the controlled current path and the junctions from reaching the breakdown threshold of the transistor and thereby avoiding junction breakdown.

In certain embodiments of the methods and apparatus of the present disclosure, the transistor is voltage biased (at node connected to the load) at a voltage level that is greater than a breakdown voltage defined, between the node and a control input, for the transistor. In those embodiments, switching the transistor between the current-conducting mode and the current-blocking mode causes spikes in a transient current through the load. Further, in other embodiments, the modulating voltage signal is a pulse-width modulation signal. Certain embodiments of the methods and apparatus of the present disclosure utilize a MOS-type transistor, and this transistor includes a drain that is voltage biased by a node connected to the load, at a voltage level that is greater than a gate-drain breakdown voltage level defined for the transistor. Moreover, in various embodiments of the present disclosure, the load includes a plurality of LEDs susceptible to change in light intensity in response to the current spikes. Further, the load can also include a plurality of receive electrodes that receive signals in a sense matrix.

Figure 1A:
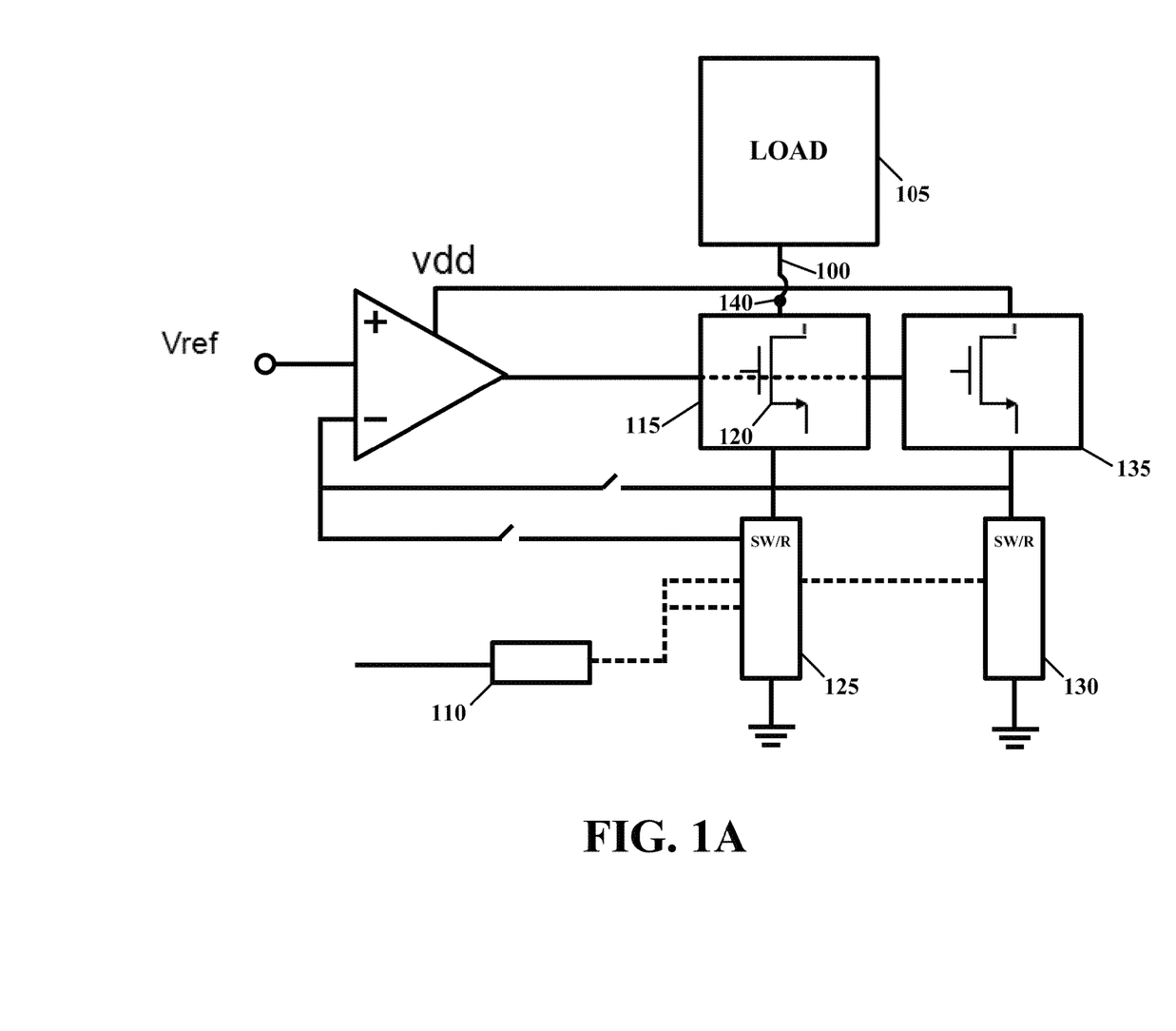
FIG. 1A shows an example output driver circuit, consistent with various aspects of the present disclosure.

Turning now to the figures, FIG. 1A shows an example output driver circuit, consistent with various aspects of the present disclosure. The output driver circuit shown in FIG. 1A includes a controlled current path 100 connected to a load 105 (e.g., light emitting diode (LED) string) that draws current from the controlled current path 100. Additionally, a control circuit 110 is provided to control current through the load 105 in the controlled current path 100 in response to first and second aspects of a voltage modulating signal (e.g., pulse width modulation signal). The control circuit 110 provides for current control to the circuit by causing a transistor circuit 115 (which includes a transistor 120) to switch between a current-conducting mode and a current-blocking mode. The transistor utilizes a first current branch 125 (including a switchable resistor) and a second current branch 130 (including a switchable resistor) in switching between the two modes. In the current-conducting mode, the control current is drawn through the first current branch 125, and in the current-blocking mode, the controlled current through the first current branch 125 is blocked. Additionally, switching the transistor 120 between the current-conducting mode and the current-blocking mode subjects junctions of the transistor 120 to voltage stresses due to current in the controlled current path 100 spiking towards a breakdown threshold of the transistor 120. The control circuit 110, in response to the first aspect of the modulating voltage signal (in the current-conducting mode), causes the transistor circuit 115 to direct current in the controlled circuit path 100 through the first current branch 125. Additionally, in response to the second aspect of the modulating voltage signal (in the current-blocking mode), the control circuit diverts the current in the controlled current path 100 from the first current branch 125 to the second current branch 130 (including a transistor-based circuit 135 as a part of the transistor circuit 115) sufficiently fast to suppress current spikes in the controlled current path 100 and the junctions from reaching the breakdown threshold of the transistor 120 and thereby avoiding junction breakdown.

In certain embodiments, the transistor 120 is voltage biased (at node 140 connected to the load 105) at a voltage level that is greater than a breakdown voltage defined for the transistor between the node 140 and a control input. In those embodiments, switching the transistor 120 between the current-conducting mode and the current-blocking mode causes spikes in a transient current through the load 105. Additionally, in certain embodiments, the transistor 120 is a MOS-type transistor (such as an extended drain NMOS transistor), and the transistor 120 includes a drain that is voltage biased by a node 140 connected to the load 105 at a voltage level that is greater than a gate-drain breakdown voltage level defined for the transistor 120. In other embodiments, the load 105 includes a plurality of receive electrodes that receive signals in a sense matrix. Additionally, in certain embodiments, the second current branch 130 is used to provide a light bias in the current-conducting mode and is activated to provide a greater bias in the current-blocking mode, thereby permitting for immediate effect when switching between the current-conducting mode and the current-blocking mode.

Figure 1B:
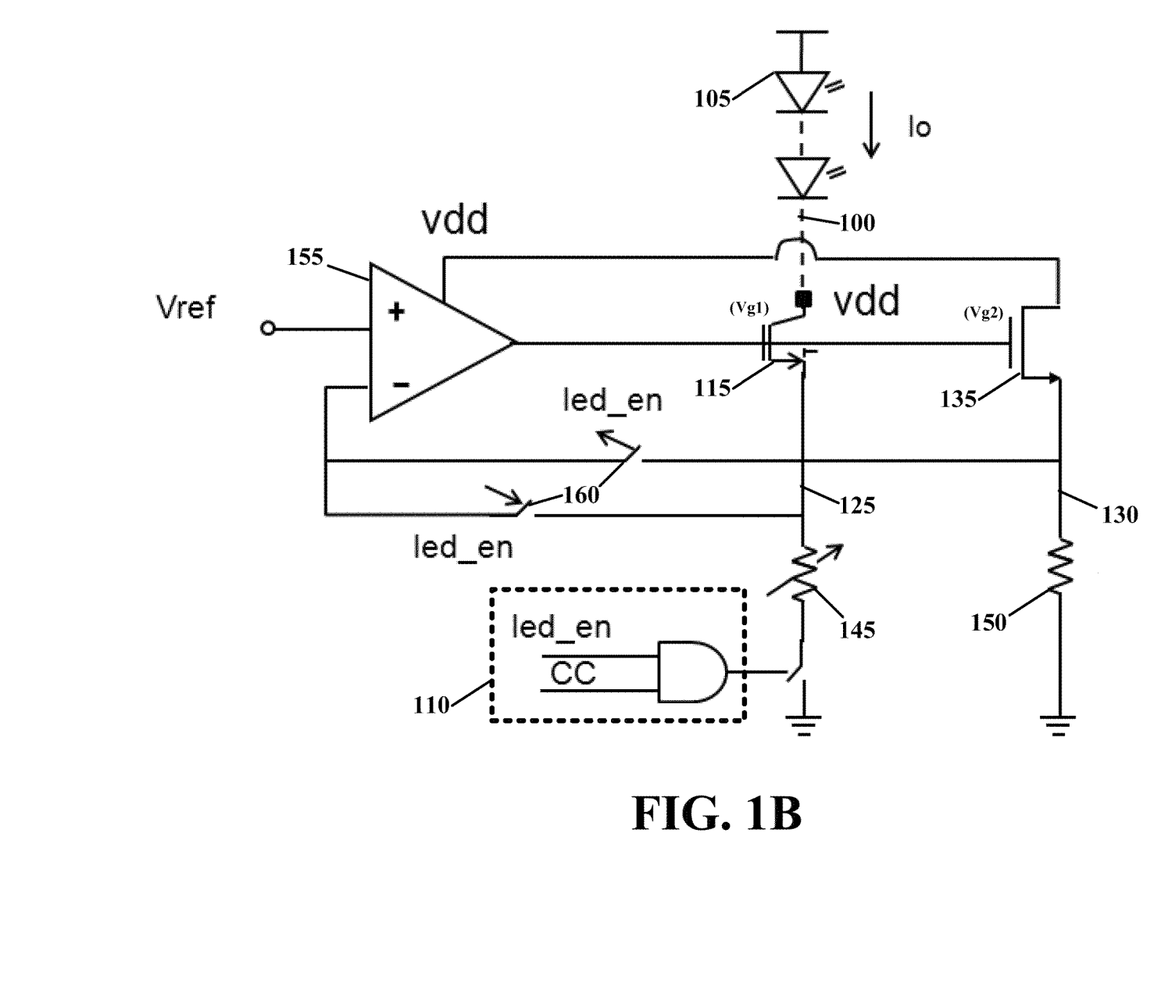
FIG. 1B shows another example output driver circuit, consistent with various aspects of the present disclosure.

FIG. 1B shows another example output driver circuit, consistent with various aspects of the present disclosure. Similar to the output driver circuit shown in FIG. 1A, the circuit of FIG. 1B includes a controlled current path 100. In the embodiment shown in FIG. 1B, the controlled current path 100 includes a LED string load 105 that draws current from the controlled current path 100, and turns on and off in response to the current. A reference voltage (Vref) is applied to a non-inverting input of an amplifier 155, the output of which is connected to a transistor circuit including a first transistor 115. The first transistor 115 is located between the controlled current path 100, and a first current branch 125. The first transistor 115 is also connected to a second transistor 135 displaced in a second current branch 130. The first current branch 125 is connected to ground through a switchable resistor 145, and the second current branch 130 is connected to ground through a resistor 150. Additionally, the amplifier 155 is connected to the second transistor 135 via the internal supply voltage (Vdd), which is also applied to the drain of the first transistor 115.

The source of the first transistor 115 is connected to the inverting terminal of the amplifier 155, creating a negative feedback loop. This provides a controlled voltage on the gate of the first transistor 115. In operation, a control circuit 110 (e.g., a logic circuit) provides a modulating voltage signal and a controlled current (CC) signal, available from a DAC (not shown), to control the various switches and transistors in the circuit. For instance, the "led_en" signal would turn on the LED string 105. Further, current is controlled, using the control circuit 110, through the LED string 105 in the controlled current path 100 in response to first and second aspects of the modulating voltage signal (e.g., led_en). The LED string 105 turns on and off in response to the controlled current. Additionally, the first and second aspects of the modulating voltage signal cause the first transistor 115 to switch between a current-conducting mode (in which the controlled current is drawn through the first current branch 125) and a current blocking-mode (in which the controlled current through the first current branch 125 is essentially blocked as would be visibly noticed).

In response to the modulating voltage signal (from the led_en signal), switches 160 in the negative feedback loop are oppositely controlled. In this manner, current is blocked in the first current branch 125 and flows in the second current branch 130 when the connection to the first current branch 125 is broken. In this instance, similar to in the first current branch 125, the controlled voltage provided by the amplifier 155 is used to turn on the first transistor 115. In this LED-blocking state, the controlled voltage holds the gate of first transistor 115 at a relatively-low voltage to disable source-drain conduction, and drive the gate of the second transistor 135 to provide feedback to the inverting input of the amplifier 155. With this configuration, the threshold voltage (Vg2) of the second transistor 135 can be much smaller than internal supply Vdd of the chip, which improves the switching performance of the driver.

Switching the first transistor 115 between the current-conducting mode and the current-blocking mode subjects junctions of the first transistor 115 to voltage stresses due to current in the controlled current path 100 spiking (which can cause the LED string 105 to malfunction), towards a breakdown threshold of the first transistor 115. However, in the current blocking mode, current diversions from the controlled current path 100 (to the second current branch 130) sufficiently fast to suppress current spikes in the controlled current path 100 and the junctions from reaching the breakdown threshold of the first transistor 115, which avoids junction breakdown.

Figure 2:
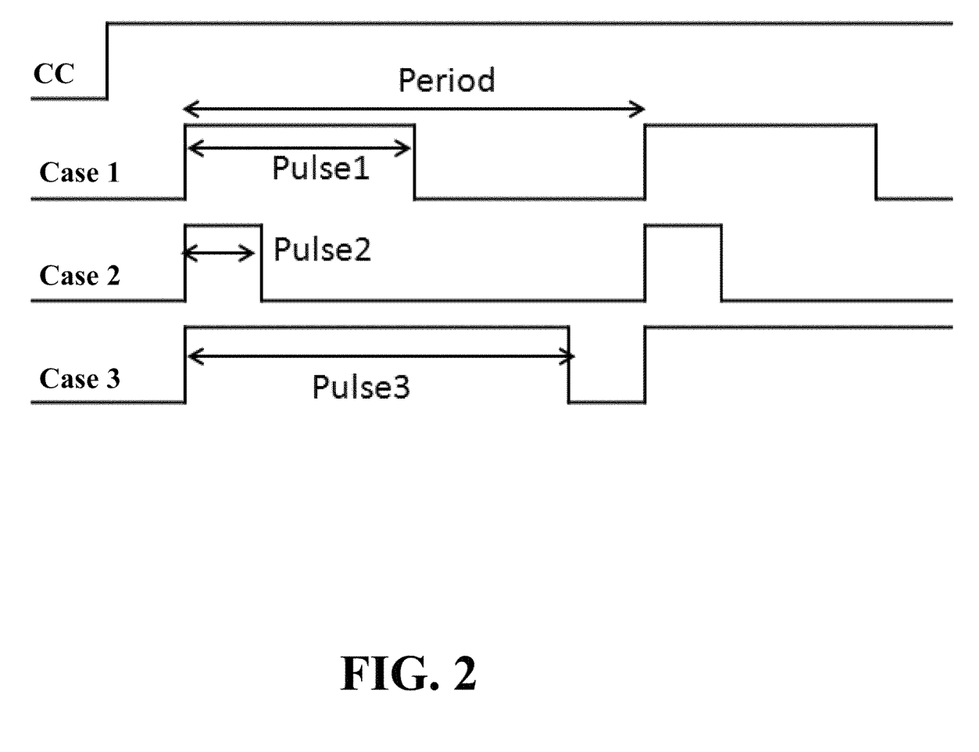
FIG. 2 shows exemplary timing diagrams for control of current through a load connected to an output driver circuit, consistent with various aspects of the present disclosure.

FIG. 2 shows exemplary timing diagrams for control of current through a load connected to an output driver circuit, consistent with above-discussed aspects of the present disclosure. Three different modulating voltage signals (e.g., led_en), as utilized in various aspects of the present disclosure, are shown in FIG. 2. Each of cases 1, 2, and 3 shows different pulse widths that form the modulating voltage signal. Additionally, FIG. 2 also shows a CC signal, which corresponds to the maximum achievable current during application of the modulating voltage signal of cases 1, 2, or 3.

Figure 3:
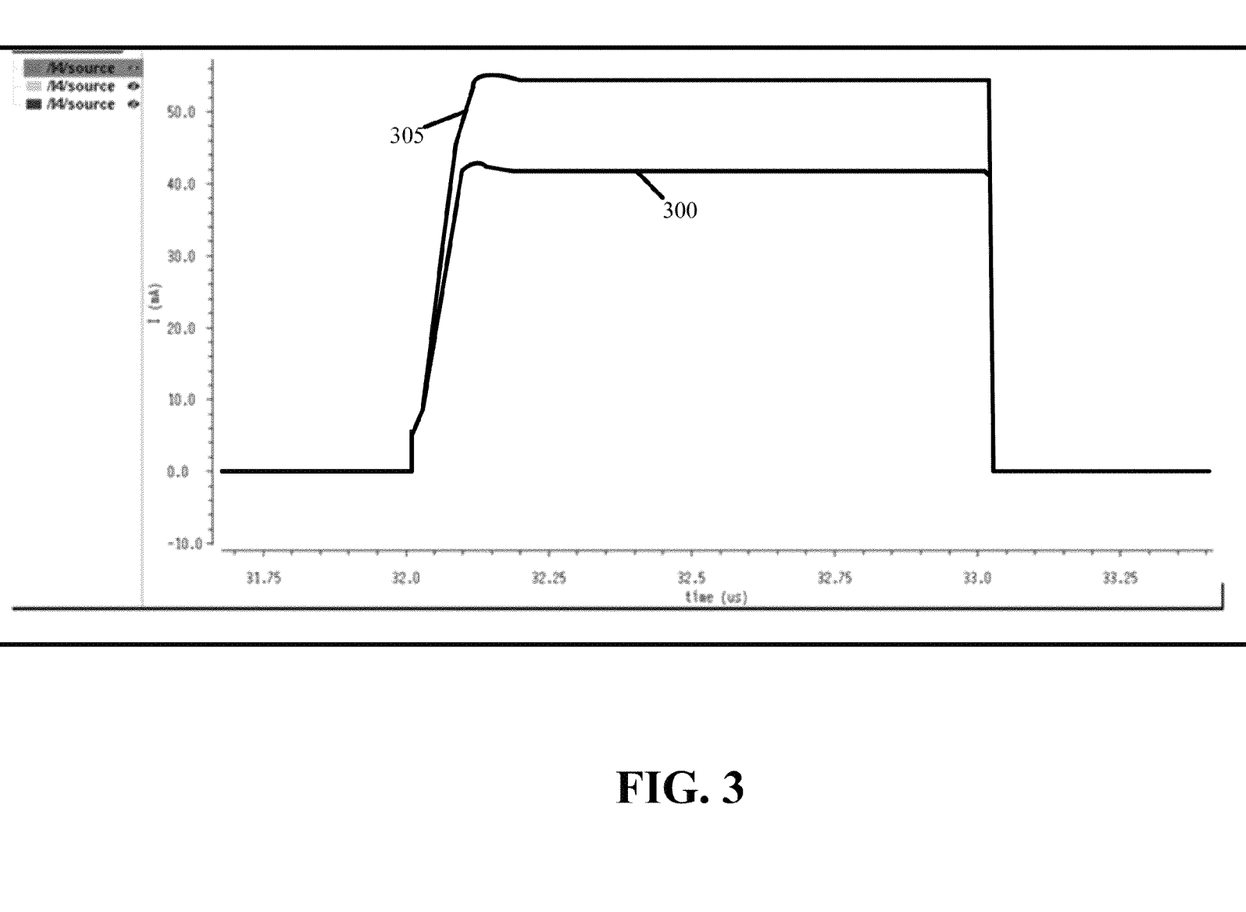
FIG. 3 shows an example plot of current flowing through two aspects of an example output driver circuit, consistent with various aspects of the present disclosure.

FIG. 3 shows an example plot of current flowing through two branches of an example output driver circuit, also consistent with the present disclosure. FIG. 3 shows an example current flow graph 300 through a first current branch and through a second current branch (graph 305), such as the branches shown in FIGS. 1A and 1B. FIG. 3 utilizes a timed modulating voltage signal have a pulse of 1 μs resulting in an output current of 54.5 mA (utilizing 3.3 Volts provided at the second branch and 4.0 Volts provided at the first branch).

Figure 4:
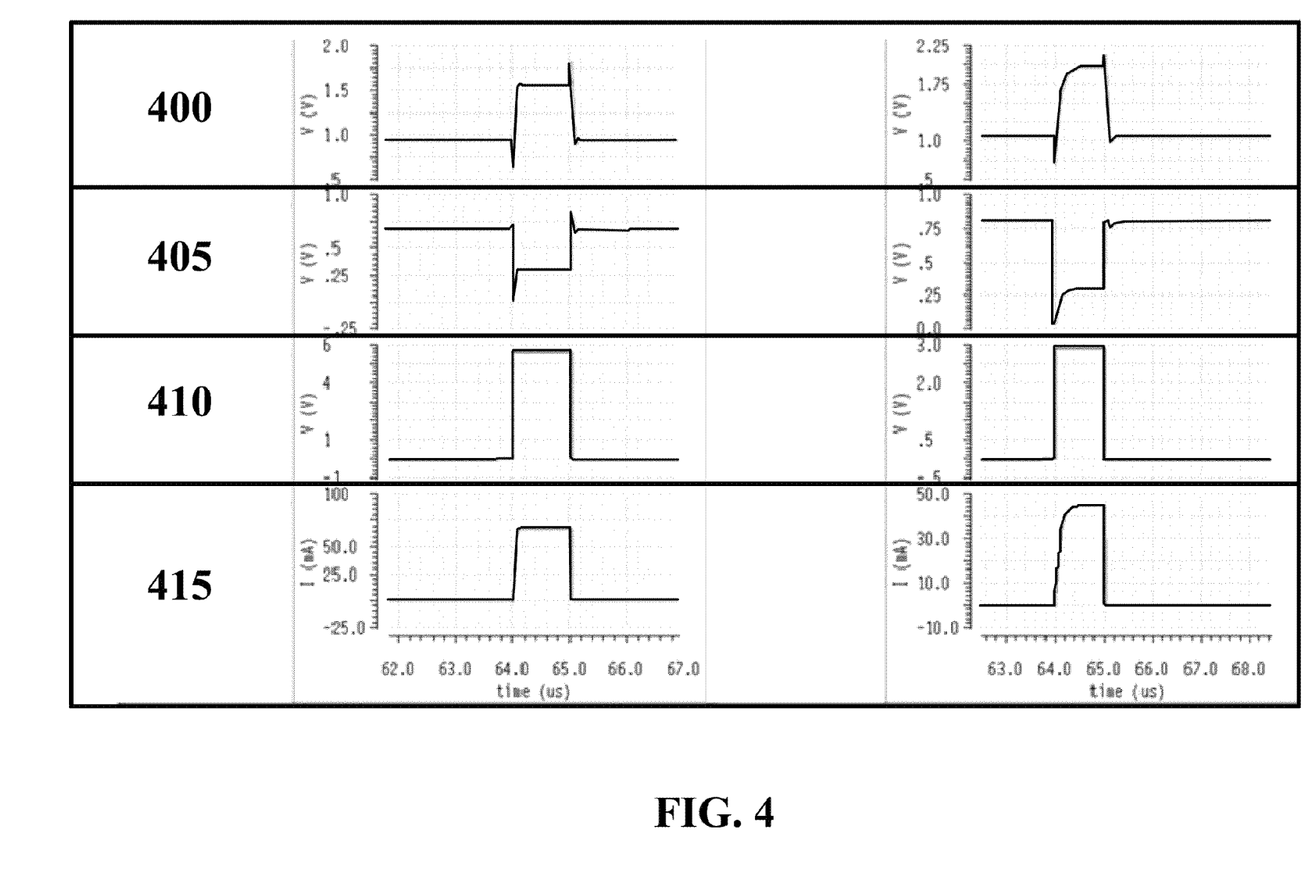
FIG. 4 shows example plots of various aspects as measured using the circuit exemplified by FIG. 1B, consistent with various aspects of the present disclosure.

Using a circuit exemplified by the circuit of FIG. 1B, FIG. 4 shows example plots of voltages surrounding the first transistor 115 of FIG. 1B. The left portion of FIG. 4 shows a switching scheme utilizing a high controlled current (CC), and the right portion of FIG. 4 shows a switching scheme utilizing a low controlled current (CC). Comparing the first three sets of plots (400, 405, and 410) demonstrate that spiking occurs during switching between on and off states of the LEDs 105 of FIG. 1B. For instance, the third set of plots 410 demonstrate the voltage modulating signal pulses applied as led_en in FIG. 1B. The first set of plots 400 (controlled current on the gate of the first transistor 115 of FIG. 1B) and the second set of plots 405 (Vdd as applied in FIG. 1B) show the existence of spiking at the corners of the voltages due to the voltage modulating signal (led_en in FIG. 1B). The fourth set of plots 415 shows the current through the controlled current path 100 of the circuit of FIG. 1B). Thus, as can be seen by the fourth set of plots 415, spiking does not occur in the controlled current path 100 using the circuitry of FIG. 1B. Accordingly, the narrow pulse programming of the modulating voltage signal controls the output current in the absence of undesirable spiking.

Figure 5:
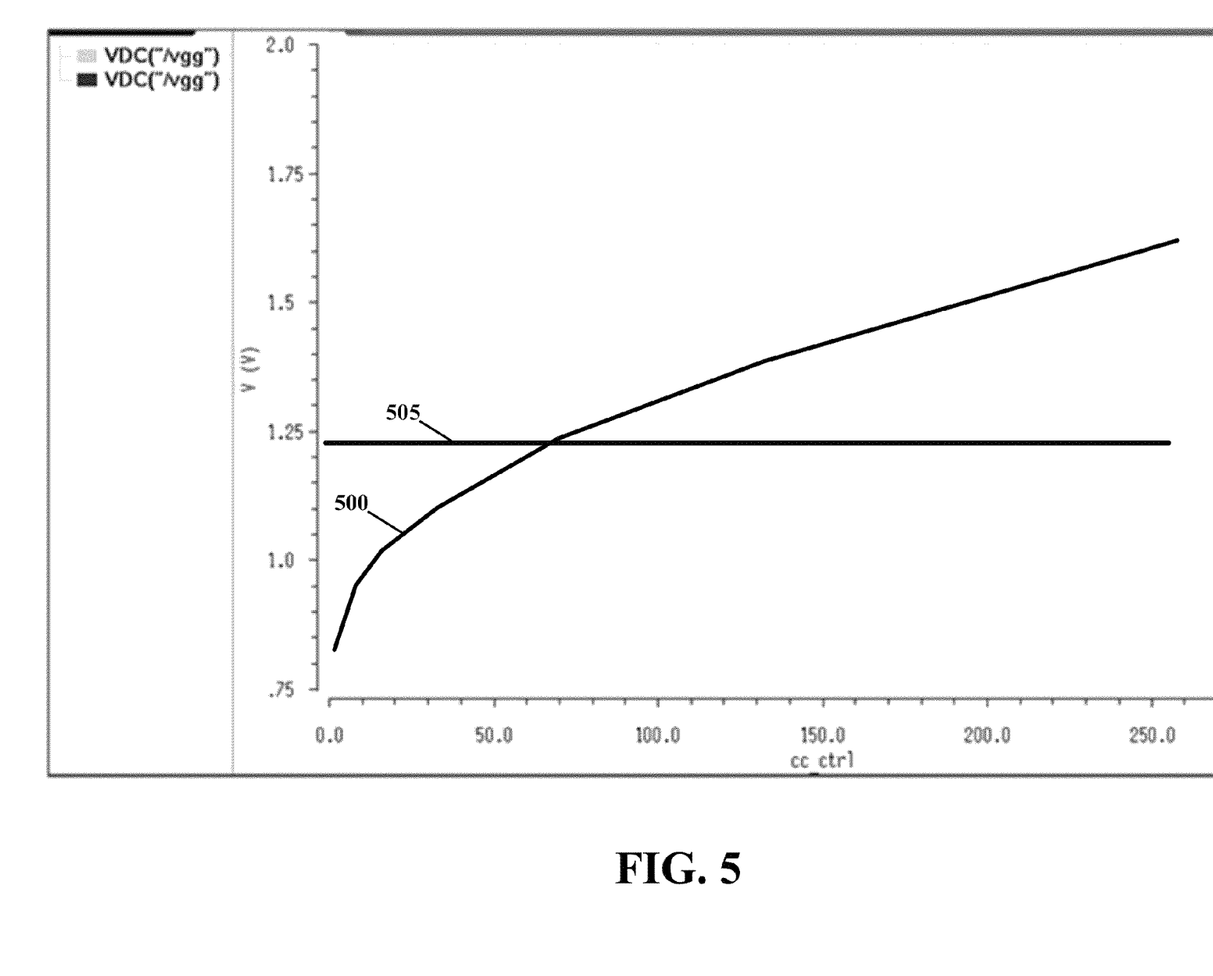
FIG. 5 shows an example plots for an example output driver circuit using the circuit exemplified by FIG. 1B, consistent with various aspects of the present disclosure.

FIG. 5 shows an example controlled voltage plot for the output driver circuit shown in FIG. 1B, consistent with various aspects of the present disclosure. FIG. 5 shows two graphs 500 and 505. The first graph 500 shows a graph of the controlled voltage of the first transistor 115 of FIG. 1B when the second current branch 130 of FIG. 1B is activated. The second graph 505 shows a graph of the controlled voltage of the first transistor 115 of FIG. 1B when the second current branch 130 is not actively diverting current and providing feedback to the amplifier 155 of FIG. 1B. When current is blocked in the first current branch 125 of FIG. 1B and diverted to the second current branch 130, the controlled voltage of the first transistor 115 is set to a voltage in the middle of the applicable voltage range to ensure smoother switching at all setting of the DAC.

Accordingly, various aspects of the present disclosure generate a constant current that utilizes a replica bias or main moderate bias for a fast transient response of switching. This can ensure safe operation of the output device against voltage stress. Further, aspects of the present disclosure allow for a smaller size of control drivers for providing the drivers on a small die size.

It will be appreciated that various modules and/or other circuit-based building blocks may be implemented to carry out one or more of the operations and activities described herein and/or shown in the figures. In such contexts, the illustrated/described modules or circuitry (blocks) "module" represent a circuit that carries out one or more of these or related operations/activities. For example, in certain of the above-discussed embodiments, one or more modules are discrete logic circuits or programmable logic circuits configured and arranged for implementing these operations/activities, as in the circuit modules shown in the Figures. In certain embodiments, the programmable circuit is one or more computer circuits programmed to execute a set (or sets) of instructions (and/or configuration data). The instructions (and/or configuration data) can be in the form of firmware or software stored in and accessible from a memory (circuit). As an example, the illustrated control circuit (e.g., 110 of FIGS. 1A and 1B) can include a combination of a CPU hardware-based circuit and a set of instructions in the form of firmware, where the first module includes a first CPU hardware circuit with one set of instructions and the second module includes a second CPU hardware circuit with another set of instructions.

Based upon the above discussion and illustrations, those skilled in the art will readily recognize that various modifications and changes may be made to the present disclosure without strictly following the exemplary embodiments and applications illustrated and described herein. As another example, the (source/drain) terminals as shown and discussed may be replaced with (drain/source) terminals of different arrangements, and different types and numbers of input configurations (e.g., involving different types of input circuits and related connectivity). In addition, resistors of various values may be used in the input state detection circuits as shown and described, together with different values of Vdd and source voltage (e.g., as the upper supply voltage for the LED string is shown in FIG. 1B), as relative to other resistors in the circuit and/or of the input circuits of which the resulting input pin state is to be evaluated. Such modifications do not depart from the true spirit and scope of the present disclosure, including that set forth in the following claims.

What is claimed is:

1. A method comprising:
providing a controlled current path including a load configured and arranged to draw current from the controlled current path;
controlling current through the load in the controlled current path, in response to first and second aspects of a modulating voltage signal, by causing a transistor circuit, including a transistor, to switch between
a current-conducting mode in which the controlled current is drawn through a first current branch,
a current-blocking mode in which the controlled current through the first current branch is blocked; and
wherein switching the transistor between the current-conducting mode and the current-blocking mode subjects junctions of the transistor to voltage stresses due to current in the controlled current path spiking towards a breakdown threshold of the transistor;
in response to the first aspect of the modulating voltage signal and in the current-conducting mode, using the transistor circuit to direct current in the controlled current path through the first current branch; and
in response to the second aspect of the modulating voltage signal and in the current-blocking mode, diverting the current in the controlled current path from the first current branch to a second current branch sufficiently fast to suppress current spikes in the controlled current path and the junctions from reaching the breakdown threshold of the transistor and thereby avoiding junction breakdown.

2. The method of claim 1, wherein the transistor is voltage biased, a node connected to the load, at a voltage level that is greater than a breakdown voltage defined, between the node and a control input, for the transistor and switching the transistor between the current-conducting mode and the current-blocking mode causes spikes in a transient current through the load.

3. The method of claim 1, wherein the modulating voltage signal is a pulse-width modulation signal, and the second current path provides a light bias in the current-conducting mode and is activated to provide a greater bias in the current-blocking mode, thereby permitting for immediate affect when switching between the current-conducting mode and the current-blocking mode.

4. The method of claim 1, wherein the transistor is a MOS-type transistor and wherein the transistor includes a drain that is voltage biased by a node connected to the load, at a voltage level that is greater than a gate-drain breakdown voltage level defined for the transistor.

5. The method of claim 1, wherein the load includes a plurality of light emitting diodes (LEDs) susceptible to change in light intensity in response to the current spikes.

6. The method of claim 1, wherein the load includes a plurality of receive electrodes configured and arranged to receive signals in a sense matrix.

7. An apparatus comprising:
a controlled current path including a load configured and arranged to draw current from the controlled current path;
a first current branch and a second current branch;
a transistor circuit, including a transistor, configured and arranged to switch between a current-conducting mode and a current-blocking mode; and
a control circuit configured and arranged to
control current through the load in the controlled current path in response to first and second aspects of a modulating voltage signal, by causing the transistor to switch between the current-conducting mode in which the controlled current is drawn through the first current branch, and the current-blocking mode in which the controlled current through the first current branch is blocked, wherein switching the transistor between the current-conducting mode and the current-blocking mode subjects junctions of the transistor to voltage stresses due to current in the controlled current path spiking towards a breakdown threshold of the transistor,
in response to the first aspect of the modulating voltage signal and in the current-conducting mode, use the transistor circuit to direct current in the controlled current path through the first current branch, and
in response to the second aspect of the modulating voltage signal and in the current-blocking mode, divert the current in the controlled current path from the first current branch to the second current branch sufficiently fast to suppress current spikes in the controlled current path and the junctions from reaching the breakdown threshold of the transistor and thereby avoiding junction breakdown.

8. The apparatus of claim 7, wherein the transistor is voltage biased, a node connected to the load, at a voltage level that is greater than a breakdown voltage defined, between the node and a control input, for the transistor and switching the transistor between the current-conducting mode and the current-blocking mode causes spikes in a transient current through the load.

9. The apparatus of claim 7, wherein the modulating voltage signal is a pulse-width modulation signal.

10. The apparatus of claim 7, wherein the transistor is a MOS-type transistor and wherein the transistor includes a drain that is voltage biased by a node connected to the load, at a voltage level that is greater than a gate-drain breakdown voltage level defined for the transistor.

11. The apparatus of claim 7, wherein the load includes a plurality of LEDs susceptible to change in light intensity in response to the current spikes.

12. The apparatus of claim 7, wherein the load includes a plurality of receive electrodes configured and arranged to receive signals in a sense matrix.

13. A method comprising:
providing a controlled current path including a light emitting diode (LED) string configured and arranged to draw current from the controlled current path and turn on and off in response thereto;
controlling current through the LED string in the controlled current path, in response to first and second aspects of a pulse-width modulation signal, by causing a transistor circuit, including a transistor, to switch between
a current-conducting mode in which the controlled current is drawn through a first current branch,
a current-blocking mode in which the controlled current through the first current branch is blocked; and
wherein switching the transistor between the current-conducting mode and the current-blocking mode subjects junctions of the transistor to voltage stresses due to current in the controlled current path spiking, causing the LED string to malfunction, towards a breakdown threshold of the transistor;
in response to the first aspect of the pulse-width modulation signal and in the current-conducting mode, using the transistor circuit to direct current in the controlled current path through the first current branch; and
in response to the second aspect of the pulse-width modulation signal and in the current-blocking mode, diverting the current in the controlled current path from the first current branch to a second current branch sufficiently fast to suppress current spikes in the controlled current path and the junctions from reaching the breakdown threshold of the transistor and thereby avoiding junction breakdown.

14. The method of claim 13, wherein the transistor is voltage biased, by a node connected to a load, at a voltage level that is greater than a breakdown voltage defined, between the node and a control input, for the transistor.

15. The method of claim 13, wherein the transistor is an extended drain MOS-type transistor and wherein the transistor includes a drain that is voltage biased by a node connected to the load, at a voltage level that is greater than a gate-drain breakdown voltage level defined for the transistor.

16. The method of claim 15, wherein the LED string includes a plurality of receive electrodes configured and arranged to receive signals in a sense matrix.

* * * * *